Patented May 19, 1925.

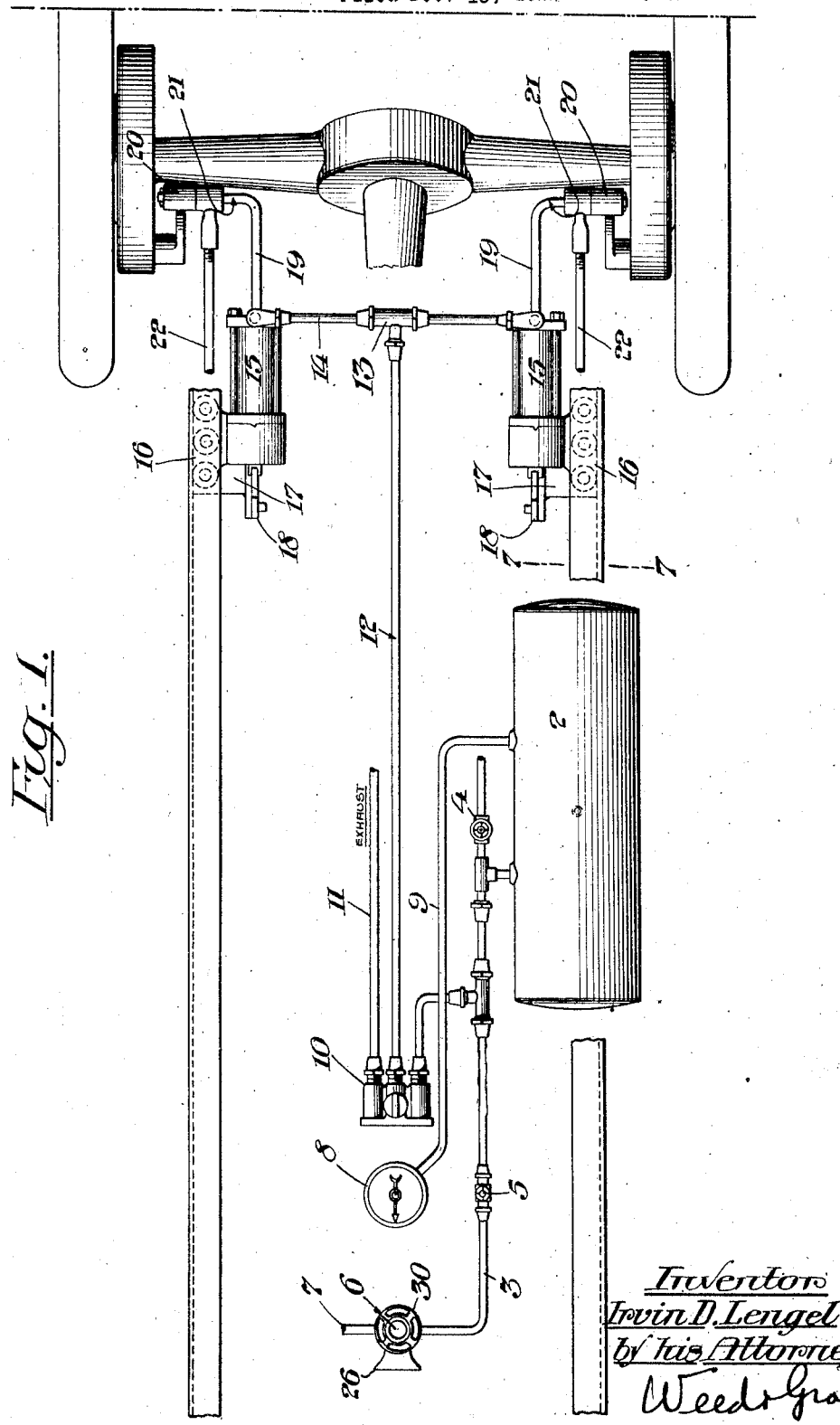

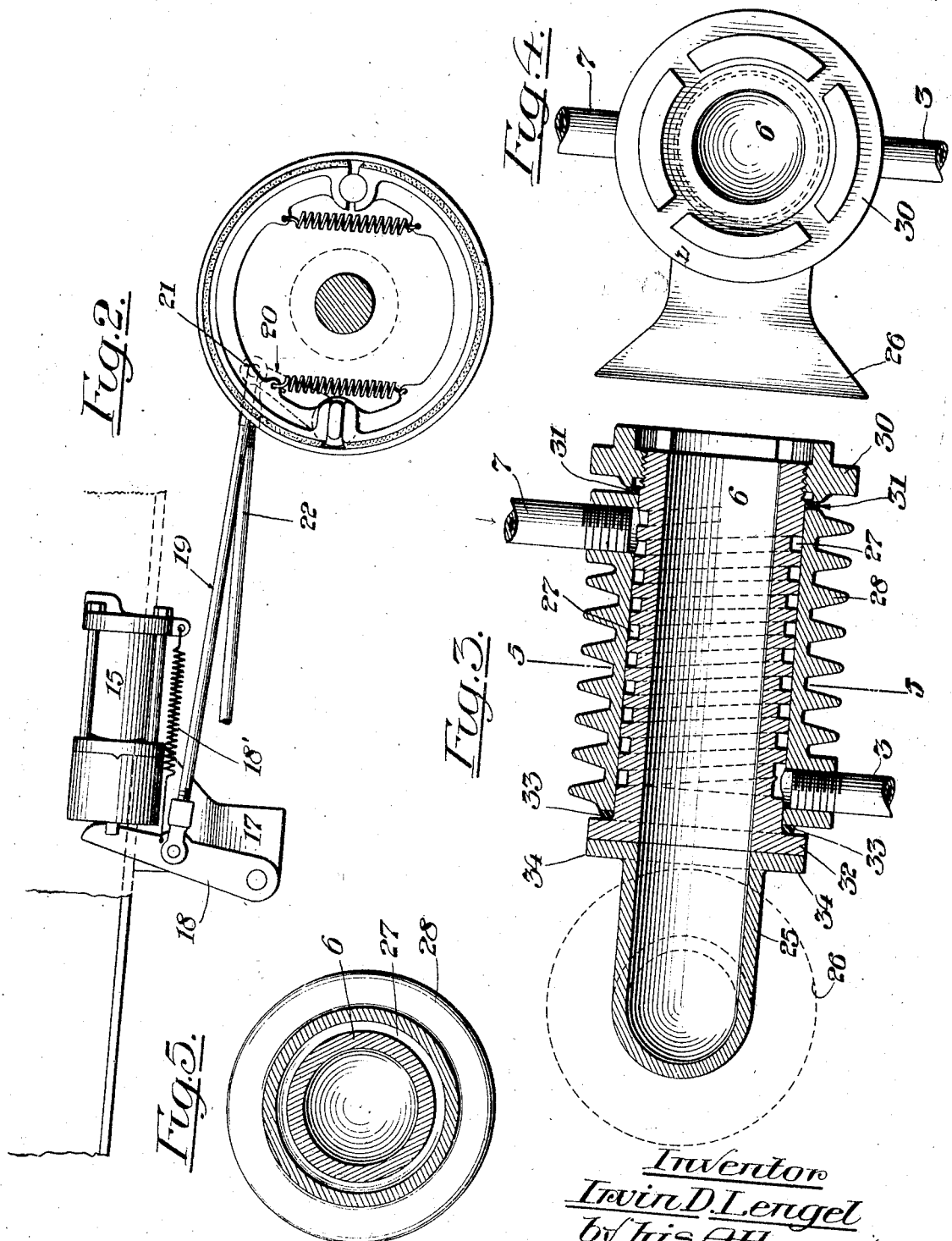

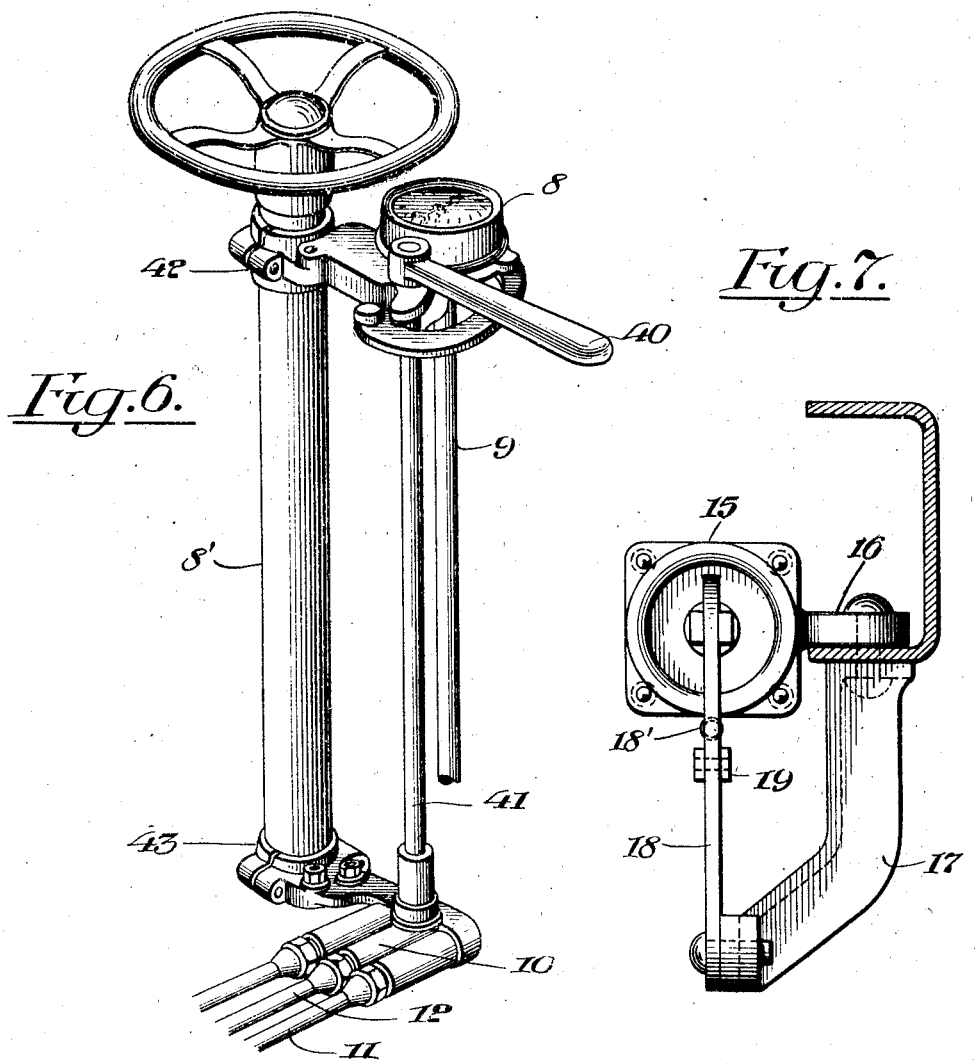

1,538,193

UNITED STATES PATENT OFFICE.

IRVIN D. LENGEL, OF READING, PENNSYLVANIA, ASSIGNOR, BY MESNE ASSIGN-
MENTS, TO SAFETY AIR BRAKE COMPANY, A CORPORATION OF DELAWARE.

FLUID OR SAFETY GAS BRAKE FOR AUTOMOBILES.

Application filed December 19, 1922. Serial No. 607,770.

*To all whom it may concern:*

Be it known that I, IRVIN D. LENGEL, a citizen of the United States, residing at Reading, in the county of Berks and State of Pennsylvania, have invented certain new and useful Improvements in Fluid or Safety Gas Brakes for Automobiles, of which the following is a specification.

This invention relates to automatic brake mechanism, particularly adapted for motor vehicles such as automobiles, the object of the invention being to provide improved safety brake operating mechanism having connection with the motor or engine in such manner that a part of the burnt mixture therefrom is utilized to set the brakes.

A further object of the invention is the provision of an improved brake operating mechanism embodying means for cooling the mixture and arresting the carbon contained therein thereby to prevent the heating of the pipes and storage tanks, fouling of the check vlave and the obstruction of the connecting passages or pipes.

A further object of the invention is the provision of a gas operated automatic safety brake operating mechanism under the control of the operator, which may be applied to a motor car without disturbing the ordinary hand and brake pedal mechanisms whereby the latter may still be used if desired in the usual way, while this improved brake mechanism may be thrown into operation, by the mere operation of a valve to exert a powerful braking effect, very much greater than can be obtained by the ordinary foot or hand brake, and in which an equalized pressure on both brakes of the wheels is effectively obtained whereby both are applied simultaneously and with the same amount of pressure, thereby materially preventing the skidding of the car, and which equalization of pressure is not usually obtained with the ordinary hand and foot brakes.

In the drawings accompanying and forming a part of this specification Fig. 1 is a plan diagrammatic view of this improved brake operating mechanism shown attached to the chassis of a car; Fig. 2 is a detail view of one of the brake piston cylinders shown attached to the ordinary brake mechanism of a car; Fig. 3 is a sectional view of the carbon arrester; Fig. 4 is a top view thereof; Fig. 5 is a cross sectional view taken on line 5—5 of Fig. 3, and Fig. 6 is a perspective view of the valve operating means and gauge shown attached to the steering post or column of the car; and Fig. 7 is a vertical section on the line 7—7 of Fig. 1 through one side of the chassis showing the manner in which the brake cylinder piston is attached.

Similar characters of reference indicate corresponding parts in the several views.

Before explaining in detail the present improvement and mode of operation thereof, I desire to have it understood that the invention is not limited to the details of construction and arrangement of parts which are illustrated in the accompanying drawings, since the invention is capable of other embodiments, and that the phraseology which I employ is for the purpose of description and not of limitation.

In the preferred form thereof shown this improved safety brake operating mechanism comprises a reservoir or storage tank 2 suitably supported by the chassis of the car. Leading therefrom is a pipe line 3 having at one part thereof a safety valve 4 and at another part thereof a check valve 5. This pipe line leads to one as the lower end of the carbon arrester and cooling means 6 hereinafter described, the opposite end of which is connected by a short pipe line 7 with one of the cylinders of the gas engine whereby upon each explosion of the gas in the engine cylinder, a small part of the burnt mixture is forced into the storage tank and there held under pressure until suitably released to operate the brakes. The check valve 5 prevents its return through the pipe 3. A suitable pressure gauge 8 shown mounted upon the steering column or post 8' is connected by a pipe line 9 with the reservoir tank to indicate the pressure in the tank. Connected with a suitable coupling in the pipe line 3 is a three-way control valve and casing 10 suitably shown mounted upon the steering wheel column. This valve is controlled by a suitable handle 40 and a connecting rod 41. In the present instance the valve handle, gauge and valve and its casing are all connected to the steering post by a pair of suitable brackets 42 and 43 in such manner that the gauge and valve handle will be just under the steering wheel and so readily accessible to the operator. Connected with this three-way valve is a suitable exhaust pipe 11, through which the exhaust passes to effect the release of the brakes. Also connected with the three-way valve is a pipe 12 connected by a suitable coupling 13 with a cross pipe 14 leading to a pair of piston cylinders 15, one at each side of the chassis. Each is suitably connected to the chassis of the vehicle as at 16 and provided with a suitable piston.

The chassis is provided with a depending bracket 17 to which is pivotally connected a lever 18 connected with the piston in the cylinder and with a spring 18' fastened to a depending lug on the cylinder and to this lever 18 a connecting rod 19 is pivoted, the opposite end of which is pivotally connected to the usual arm 20 of one of the brakes, as for instance the foot pedal brake thus forming a compound lever mechanism. It is to this arm 20 that the usual brake rod 22 of one of the ordinary brake mechanisms as the foot pedal brake mechanism is attached. This attachment is usually effected by means of a pin extending through the end of the ordinary connecting rod 22 and the outer end of the brake arm 20. In attaching the present brake mechanism this pin is removed and the connecting rod 19, which is provided with a bent end 21 for the purpose takes its place and therefore passes through both the connecting rod 22 and the end of the arm 20 and is suitably secured by a cotter pin. Thus the rod 19 serves as a means of connecting the ordinary brake rod 22 to the arm 20 so that the arm 20 can be operated either by the foot pedal or by this improved braking mechanism.

It will be observed that when the gas or fluid from the reservoir tank is permitted to pass into the cross pipe 14, it will flow equally into both brake cylinders and thus operate the pistons and apply the brakes equally and powerfully, for in practice it has been found that the tank pressure rises rapidly during the operation of the engine to 60 pounds per square inch and at which pressure the safety valve may be set. When the tank pressure is 40 pounds it has been found that the pull on the brake rod is approximately 222 pounds, at 50 pounds tank pressure, the pull is approximately 276 pounds and at 60 pounds it is 331 pounds, and as the crank arms 20 on the brake bands will further multiply this pull six or eight times, it follows that the braking effect is very much greater than can possibly be exerted by a foot pedal or hand brake lever, and this without any other exertion on the part of the operator than to move the handle of the three-way control valve. Moreover the lever connections 18 and 19 also materially assist in multiplying this power and as the two brake cylinders are connected to a single connecting pipe located centrally thereof, it follows that the pressure on the two piston cylinders is equalized so that they operate equally and exert the same force through the brake bands on each rear wheel which materially helps to prevent the skidding of the car, yet if the operator desires he can brake his car by the ordinary hand brake or foot pedals which are left intact on the car.

This improved brake operating mechanism also makes it possible to install a duplicate control valve in the tonneau of the car so that those in the rear seat can likewise apply the brakes if desired, and the whole braking mechanism can be readily installed by the mere attachment of the brake cylinders to the chassis and the support of the tank by any suitable means from the chassis, and the attachment of the gauge and controlling valve in any simple and adequate manner. One of the advantages of this improved mechanism is that zero weather has no effect on it as there is nothing about it to freeze. This brake mechanism will also brake a 5-ton truck as well as a car of smaller capacity.

Any slight residue of unburnt mixture left in the storage tank may be readily drained by a pet cock on the under side of the tank.

For the purpose of cooling the burnt mixture as it is expelled during each explosion of the engine and for arresting the carbon contained in the mixture, which would otherwise foul the check valve and obstruct the pipes or passages, I have provided a mixture cooling and carbon arresting means shown in detail in Fig. 3.

This comprises a tubular or hollow body member 25, open at each end, one end, as the lower end being provided with a flaring mouth 26 for the reception and passage of atmospheric air, and this flaring mouth may be located so that the fan of the engine will force cool air up through this member. The outer wall of this member 25 is provided with a spiral groove or passage 27 and this member is enclosed by a casing 28, thus forming a closed helical passage of suitable length, and so forming an air-cooled chamber cooled by the passage of the air centrally through the member 25. The casing 28 is provided with suitable fins which also assist in cooling the burnt mixture as it passes through the helical passage to the reservoir. At one, as the upper end of the casing 28 is connected the pipe 7 which leads to one of the cylinders of the engine, and at another, as the lower end of the casing 28 is connected the other pipe 3 which leads to the reservoir. Thus it will be seen that the burnt mixture passes through pipe 7, to the helical passage and so around the hollow member 25 and out through pipe 3 to the reservoir.

During its passage the carbon is extracted by the walls of the spiral passage. The two members 25 and 28 are secured together by some suitable means which will permit the removal of the inner member 25 for cleaning purposes. In the present instance this is shown as an internally threaded ring member 30 turned on to the inner member 25 and adapted to be turned up tight against a gasket 31 located at the juxtaposed end of the casing 28 so that the casing is tightly forced against a flange 32 having a gasket 33 therebetween and the casing. This flange 32 of the inner member 25 is held in gas tight engagement with a similar flange 34 on the mouth portion of inner member; and these flanges are suitably connected so that that part of the member 25 carrying the spiral passages may be readily detached for cleaning purposes.

From the foregoing it will be seen that the burnt gases from one of the cylinders of the engine pass through the cooling and carbon arresting chamber or means to the reservoir tank and when it is desired to apply the brakes the operator merely shifts the control valve permitting the stored gas to pass to the brake cylinders thereby operating the piston cylinders and setting the brakes. By operating the control valve to connect it with the exhaust pipe the pressure is exhausted in the piston cylinders and the brakes are released.

The whole mechanism is very simple in construction, effective in use, and is easily applied without detaching or disturbing the ordinary pedal and hand operated brake mechanisms.

It is to be understood that by describing in detail herein any particular form, structure, or arrangement, it is not intended to limit the invention beyond the terms of the several claims or the requirements of the prior art.

Having thus explained the nature of my said invention and described a way of constructing and using the same, although without attempting to set forth all of the forms in which it may be made, or all of the modes of its use, I claim:

1. In a device of the character described, a reservoir, a pipe for conveying thereto the semiburned gases from the combustion chamber of an internal combustion engine, a check valve in said pipe, carbon arresting means located intermediate of said check valve and the source of said gases, a brake actuating mechanism, a pipe for conveying the carbon-free gases from said reservoir to said brake actuating mechanism, and a fluid pressure controlling valve intermediate said reservoir and said brake actuating mechanism.

2. In a device of the character described, a reservoir, a pipe for conveying thereto the semiburned gases from the combustion chamber of an internal combustion engine, a check valve in said pipe, carbon arresting means located in said pipe intermediate of said check valve and the source of said gases, means located in said pipe also intermediate of said check valve and the source of said gases for cooling the latter, a brake actuating mechanism, a pipe for conveying the carbon-free and cooled gas from said reservoir to said brake actuating mechanism, and a fluid pressure controlling valve intermediate said reservoir and said brake actuating mechanism.

3. In a device of the character described, a reservoir, a pipe for conveying thereto the semiburned gases from the combustion chamber of an internal combustion engine, a check valve in said pipe carbon arresting means located in said pipe intermediate of said check valve and the source of said gases, means located in said pipe also intermediate of said check valve and the source of said gases for cooling the latter, said carbon arresting means and said cooling means comprising a unitary structure, a brake actuating mechanism, a pipe for conveying the carbon-free and cooled gas from said reservoir to said brake actuating mechanism, and a fluid pressure controlling valve intermediate said reservoir and said brake actuating mechanism.

4. In a device of the character stated, a reservoir, a pipe for conveying thereto the semiburned gases from the combustion chamber of an internal combustion engine, a check valve in said pipe, means located in said pipe intermediate said check valve and the source of said gases for cooling the latter, said means consisting of a casing, having a passage to convey the cooling medium through said casing, a brake actuating mechanism, a pipe for conveying the cooled gases from said reservoir to said brake actuating mechanism, and a fluid pressure controlling valve intermediate said reservoir and said brake actuating mechanism.

5. In a device of the character stated, a reservoir, a pipe for conveying thereto the semiburned gases from the combustion chamber of an internal combustion engine, a check valve in said pipe, means located in said pipe intermediate said check valve and the source of said gases for cooling the latter, said means comprising a spiral conduit for said gases, means for directing a cooling medium upon the inner and outer walls of said spiral conduit, a brake actuating mechanism, a pipe for conveying the cooled gas from said reservoir to said brake actuating mechanism, and a fluid pressure controlling valve intermediate said reservoir and said brake actuating mechanism.

6. In a brake operating mechanism for automobiles, the combination with brake actuating mechanisms, of automatic brake mechanism connected with the engine and with a part of said brake actuating mechanisms whereby the automatic brake mechanism is operated through the medium of the engine, and means for controlling said automatic brake mechanism independently of the foot pedal and hand brake mechanisms.

7. In a brake operating mechanism for automobiles, the combination with brake actuating mechanisms including a connecting rod and a brake arm, of a pair of piston cylinders, a lever connected with each piston, a brake rod connected with the lever and with the brake arm and constructed to also connect said first rod with the brake arm, a storage tank connected with the engine and with the piston cylinders, and means for controlling the passage of fluid from the storage tank to the cylinders.

Signed at Reading, Pa., this 15th day of December, 1922.

IRVIN D. LENGEL.